United States Patent [19]

Hiruma et al.

[11] Patent Number: 4,931,647

[45] Date of Patent: Jun. 5, 1990

[54] RADIATION IMAGING APPARATUS

[75] Inventors: Teruo Hiruma; Shinji Ohsuka, both of Shizuoka, Japan

[73] Assignee: Hamamatsu Photonics Kabushiki Kaisha, Shizuoka, Japan

[21] Appl. No.: 186,342

[22] Filed: Apr. 26, 1988

[30] Foreign Application Priority Data

Apr. 28, 1987 [JP] Japan ................................. 62-105922

[51] Int. Cl.$^5$ ................................................ G01T 1/29
[52] U.S. Cl. ..................................... 250/368; 250/366
[58] Field of Search .......................... 250/368, 367, 366

[56] References Cited

U.S. PATENT DOCUMENTS 3,784,816  1/1974  Abrahamsson ........................ 378/73

FOREIGN PATENT DOCUMENTS 58-153190  9/1983  Japan ..................................... 250/368
61-182532  8/1986  Japan ..................................... 250/349
61-296290  12/1986  Japan .

OTHER PUBLICATIONS

D. M. Vasil'ev, V. D. Verbitskii and Yu F. Titovets, "A Differential Counter for Structural Analysis", Translation of (Pribory i Tekhnika Éksperimenta, No. 5, (Sep.-Oct., 1974), pp. 195-196.

Primary Examiner—Constantine Hannaher
Attorney, Agent, or Firm—Finnegan, Henderson, Farabow, Garret and Dunner

[57] ABSTRACT

A radiation imaging apparatus comprising scintillators for converting radiation from a sample into scintillation light, image intensifiers for amplifying the scintillation light and forming an amplified image of the radiation, the image guides for directing the scintillation light to the respective image intensifiers. The observing field of a sample is conceptually partitioned into plural sections with each section corresponding to a respective one of the image intensifiers. One end of each image guide faces a respective section of the sample and the other end of each image guide is connected to a respective image intensifier.

15 Claims, 3 Drawing Sheets

RADIATION IMAGING APPARATUS

BACKGROUND OF THE INVENTION

1. Field of the Invention

This invention relates to a radiation imaging apparatus for measuring a two-dimensional distribution of radioactive isotope in a sample, and more particularly to a radiation imaging apparatus capable of imaging the area of an observing field many times as large as the effective area of the input surface of an image intensifier.

2. Description of the Prior Art

A photograph technique using a photographic film to record the distribution of radiation-emitters has been conventionally utilized in an autoradiographic technique for measuring the two-dimensional distribution of radioactive isotope in a sample, or in a radiographic technique for measuring transmissivity of a sample with respect to the radiation.

The photographic technique has many disadvantages including that a photographic film must be exposed to the radiation for several weeks to several months; that a monitoring operation can not be conducted while the photographic film is being exposed to the radiation, and that it is complicated and difficult to accurately measure the quantity of the detected radiation based on a blackening density of the light-exposed portion of the film.

Applicants have previously invented another technique (apparatus) as shown in FIG. 1, for measuring the distribution of the radiation-emitters, in which the radiation is converted into scintillation light by a scintillator (22) and then is converged on a recording apparatus comprising an image intensifier (25), an image pickup device (26) and an image memory (32) in order to record the distribution of the radiation-emitters. This apparatus is disclosed in detail in Japanese published unexamined application No. 296290/86 (published on Dec. 27, 1986). As shown in FIG. 1, the radiation emitted from a sample (23) situated on a sample-rest (21) is incident to a scintillator (22) which covers the sample, and is converted into scintillation light by the scintillator. The emitted scintillation light is converged through an optical lens (24) onto a photocathode of the image intensifier (25) in order to convert the scintillation light image into an amplified electron image. The electron image is amplified by a microchannel plate (MCP) in the image intensifier. The amplified electron image is converted into a phosphor image on the phosphor screen of the image intensifier. The phosphor image is projected through an optical lens (60) onto the image pickup device (26) followed by subsequent image processing.

The apparatus as shown in FIG. 1 overcomes the disadvantages associated with the photographic technique, and has an additional advantage that the magnitude of the area of the observing field can be optionally varied to some extent using an optical lens. However, the technique of FIG. 1 has the disadvantage that the light collecting efficiency of the technique is considerably low, i.e., ordinarily only about several percentages. For example, approximately 1% collecting efficiency is obtained if the diameter of the optical lens is 4 cm and the distance between the lens and an object to be measured is 10 cm. It is apparent from the above discussion that the technique of FIG. 1 can detect only a few photons in an emission phenomenon of ultra-low-level light, such as radioluminescence, and therefore is severely restricted in detection ability.

There has been proposed a method eliminating the use of an optical lens in which a scintillator and a sample are closely contacted to a fiber plate input-type of image intensifier. This method improves the collecting efficiency of the radio-luminescence to some extent, but has the disadvantage that the magnitude of the area of the observing field is limited to the effective area of the input surface of the image intensifier.

SUMMARY OF THE INVENTION

An object of the present invention is to provide an impressed radiation imaging apparatus for measuring a distribution of radiation-emitters.

Another object of the present invention is to provide a radiation imaging apparatus having high light collecting efficiency.

A further object of the present invention is to provide a radiation imaging apparatus having an increased area of the observing field, which is not limited by the effective area of the input surface of an image intensifier.

A still further object of the present invention is to provide a radiation imaging apparatus having high light collecting efficiency and an increased area of the observing field, which is not limited by the effective area of the input surface of an image intensifier.

These and other objects are achieved by a radiation imaging apparatus comprising scintillator means for converting radiation from a sample into scintillation light; a plurality of image intensifiers for amplifying the scintillation light and forming an amplified image of the radiation, and a plurality of image guides for directing the scintillation light to the respective image intensifiers, in which apparatus the observing field of the sample is conceptually partitioned into a plurality of sections, one end of each image guide is dispersed to closely face a different one of the sections of the sample and the other end of each image guide is connected to a respective one of said image intensifiers.

BRIEF DESCRIPTION OF THE DRAWINGS

The manner by which the above and other objects are attained will be fully apparent from the following detailed description when considered with the accompanying drawings, wherein.

DETAILED DESCRIPTION OF THE INVENTION

In the radiation imaging apparatus according to one embodiment of the present invention, the observing field of the sample is conceptually partitioned into plural sections, for example, four sections. Each of the four sections is assigned a corresponding image guide and a scintillator provided at one end of each of the image guides. The radiation from the sample is converted into scintillation light through the scintillator and then is directed through the image guide to the photocathode of the image intensifier having photocounting sensitivity, whereby the radiation is converted into photoelectrons. The photoelectrons are amplified within a microchannel plate (MCP), the spatial information being maintained, and impinge on the phosphor screen to produce the phosphor image corresponding to the radiation image.

Video signals outputted from each image intensifier are stored in an image memory and the phosphor image, that is, the reproduced radiation image is displayed on the screen of a monitor.

Figure 1:
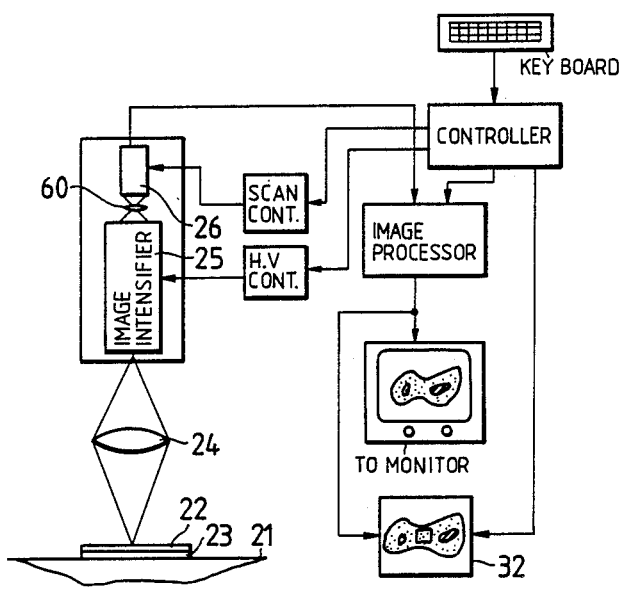
FIG. 1 is a block diagram for a conventional radiation imaging apparatus.
Figure 2:
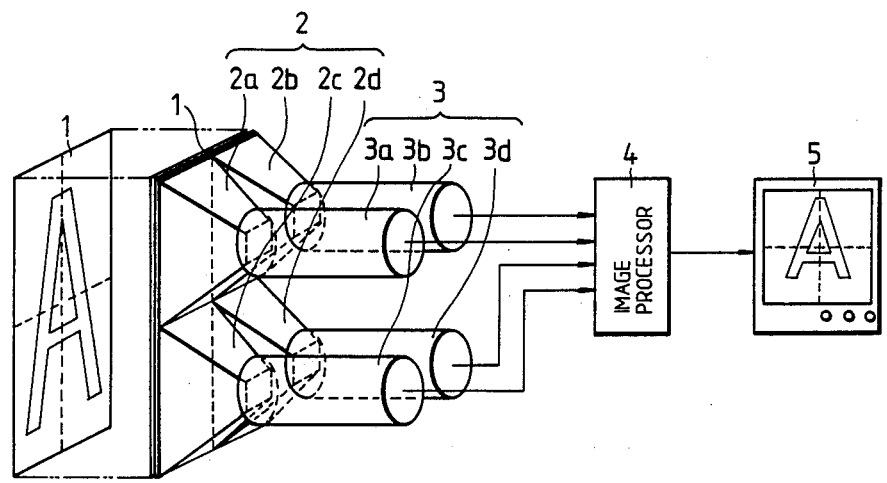
FIG. 2 shows a first embodiment of the radiation imaging apparatus according to the invention.

FIG. 2 is a block diagram for a first embodiment of the radiation imaging apparatus according to the present invention.

In FIG. 2, reference numeral 1 represents a sample which emits radiation to be measured. The sample has a broad observing field, for example 100 mm × 100 mm in cross section. Plural image guides, e.g., four image guides 2 (2a, 2b, 2c and 2d) are assigned to the sample (1) in such a manner that one end of each of the respective image guides closely faces the samples as shown in FIG. 2. The other end of each of the respective image guides 2 (2a, 2b, 2c and 2d) is connected to a respective photodetector 3(3a, 3b, 3c and 3d), and is further connected through an image processor (4) to a TV monitor (5).

Each image guide has one end with, for example, a 50 mm × 50 mm cross section so that the one end is fit to one of the four sections constituting the observing field and another smaller end of, for example, a 17 mm × 17 mm cross section so that the observing field is reduced in size to one-third. The image guide therefore has a trapezoidal cone structure as shown, for example, in FIG. 2.

Figure 3:
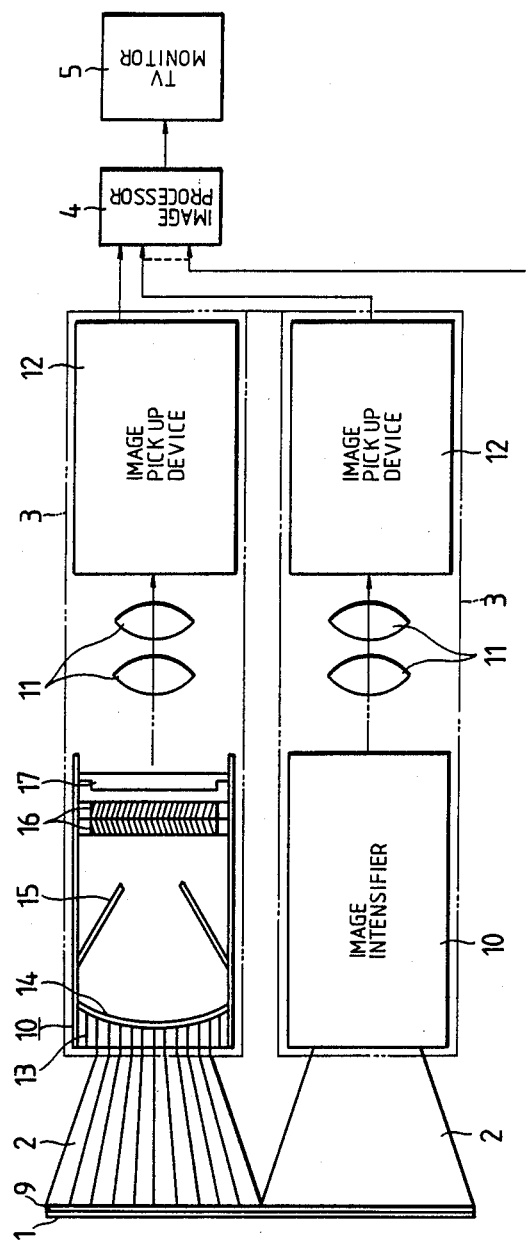
FIG. 3 is a sectional view of the radiation imaging apparatus as shown in FIG. 2.
Figure 4:
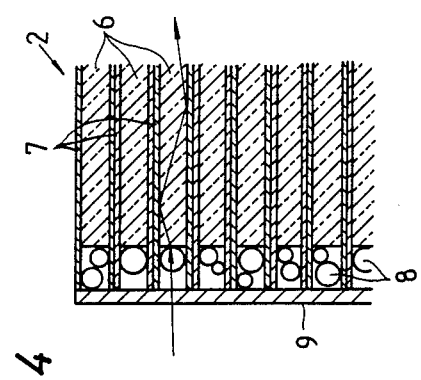
FIG. 4 is an enlarged sectional view of the image guide according to the invention.

Each imaging guide (2) comprises plural optical fibers which taper into a bundle as shown in FIG. 3. Each optical fiber has a first diameter approximately 10 microns at one end and a second diameter of approximately one-third as large as the first diameter at the other end and is coated with a cladding (7) as shown in FIG. 4. Further, the image guide is provided with fine scintillator particles (8) at one end of the respective optical fibers (6), as shown in FIG. 4, and is covered with a thin protective film (9) at the contact surface with the sample as illustrated in FIGS. 3 and 4.

Each detector (3) comprises a fiber input-type of image intensifier (10), a relay lens system (11) and an image pickup device (12) with low lag, and the fiber input-type of image intensifier (10) comprises input fibers (13), a photocathode (14), a focusing electrode (15), a 2-stage MCP (microchannel plate) (16), and a phosphor screen (17) as shown, for example, in FIG. 3.

The operation for the radiation imaging apparatus having the above construction will be described below.

Radiation (α-ray, β-ray, etc.) emitted from each section of the sample (1) is incident to an input surface of each image guide 2a, 2b, 2c of 2d which closely faces each section, and is converted into scintillation light having a wavelength within the ultraviolet and visible ranges by the fine scintillator particles (8). The scintillation light emitted at one end of the image guide is propagated in the image guide as shown in FIG. 4 and is outputted from the other end. The outputted scintillation light image is reduced in size because the image guide has a tapered structure, that is, it has an output end smaller in cross-sectional area than the input end, as shown in FIG. 3. The output scintillation light is incident to the photocathode (14) of the image intensifier to be converted into photoelectrons, thereafter is multiplied by the MCP (16) while the spatial information is maintained, and impinges on the phosphor screen (17) to form the phosphor image corresponding to the amplified electron image. The output light from the image intensifier (10) is passed through the relay lens system (11) and is detected by the image pickup device (12), which has low after-image in order to supply the image processor (4) with the spatial and luminance information (two-dimensional information) of the phosphor image.

In the image processor (4), the centroids of the luminance emission points on the phosphor screen, which are caused by the scintillation photon and which constitute the phosphor image, are determined on the basis of video signals from each of the detectors 3a, 3b, 3c or 3d, and are memorized and stored in the image memory.

The observing field which has been conceptually partitioned into the four sections is re-integrated on the basis of the spatial and luminance information by the image processor and is displayed on the TV monitor as shown in FIG. 2. If necessary, other image processing operations may be conducted in the image processor.

In the first embodiment as described above, the observing field of the sample (1) is conceptually partitioned into four sections, each of which is assigned one of four image guides 2a to 2d and one of four detectors 3a to 3d. In accordance with the size and the shape of the observing field, there may be used in proper combination, image guides having reduction ratios different from each other, image guides having no reduction function, or image intensifiers having incident areas different from each other.

Figure 5:
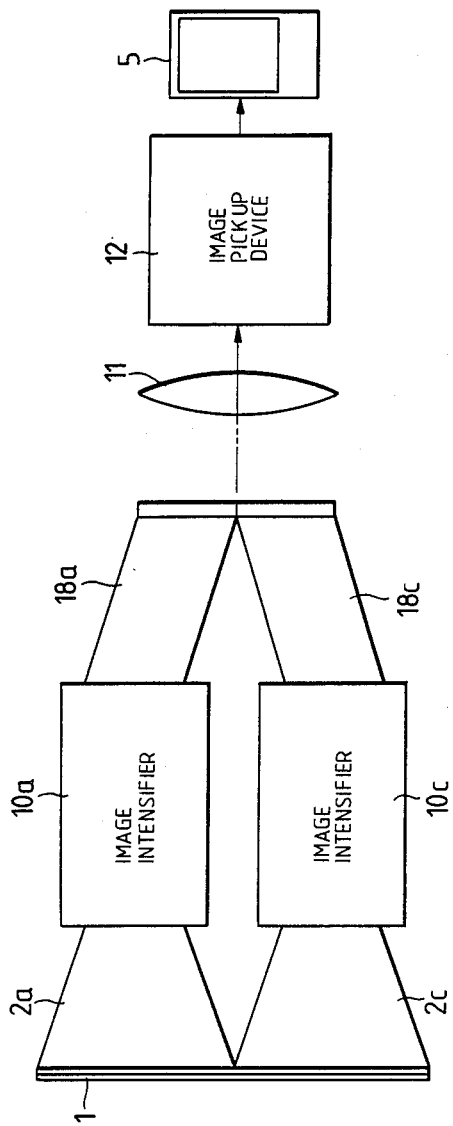
FIG. 5 shows a second embodiment of the radiation imaging apparatus according to the invention.

Further, in the first embodiment as described above, plural image pickup devices with low lag are provided and independently connected through the relay lenses to the output side of each image intensifier. The present invention is not limited to the above construction of the image pickup devices. For example, further image guides 18a to 18d as referred to, for example, in FIG. 5 may be provided so that one end of each of the respective image guides is connected to the output of a respective image intensifier. The other end of each of the respective image guides is made into a bundle with the ends of the other image guides and is connected through a relay lens (11) to an image pickup device with low lag (12) as shown in FIG. 5, to re-integrate the partitioned sections of the observing field in the image pickup device. This construction of the image pickup devices can be employed to eliminate the integrating operation of the image processor (4).

According to the present invention, an observing field of a sample is conceptually partitioned into plural sections. The radiation imaging apparatus according to the invention, comprises image guides each of which is provided with a scintillator to convert radiation into scintillation light, image intensifiers for producing video signals based on the scintillation light, and means to re-integrate the radiation image corresponding to the observing field, so that the observing field is not limited to the input surface area of an image intensifier in order to effectively use scintillation light and improve detection sensitivity of radiation.

What is claimed is:
1. A radiation imaging apparatus comprising:
scintillator means for converting radiation from an observing field of a sample into scintillation light;
a plurality of image intensifiers, each of said image intensifiers for amplifying said scintillation light and forming an amplified optical image corresponding to said radiation; and a plurality of image guides singly associated with said plurality of image intensifiers, for directing said scintillation light to said respective image intensifiers, said observing field of said sample being partitioned into a plurality of two-dimensional sections by said image guides one end of each of said image guides being closely spaced from and facing a section of said sample and the other end of each of said image guides being connected to said respective image intensifier, whereby a continuous image can be reintegrated from the outputs of said plurality of image intensifiers.

2. A radiation imaging apparatus according to claim 1, wherein said one end of each of said image guides is larger in cross-sectional area than said other end thereof.

3. A radiation imaging apparatus according to claim 1, wherein each of said image guides is provided with a scintillator in said one end.

4. A radiation imaging apparatus according to claim 1, wherein each of said image intensifiers has photo-counting sensitivity.

5. A radiation imaging apparatus according to claim 1, wherein said image intensifiers are fiber optic input image intensifiers.

6. A radiation imaging apparatus according to claim 1, said apparatus further comprising image pickup means optically connected to said image intensifiers, for converting said amplified optical images of said image intensifiers into video signals corresponding to said radiation.

7. A radiation imaging apparatus according to claim 6, further comprising an image processor for integrating said video signals from said image pickup means.

8. A radiation imaging apparatus according to claim 6, wherein said image pickup means comprises a plurality of image pickup devices each of which is optically connected to each of said image intensifiers and forms a video signal corresponding to said amplified optical image of said each image intensifier.

9. A radiation imaging apparatus according to claim 8, wherein a relay lens is provided between said each image intensifier and said each image pickup device.

10. A radiation imaging apparatus according to claim 6, said apparatus further comprising a plurality of other image guides one ends of which are optically connected to respective output sides of said image intensifiers and the other ends of which are made into a bundle, said optical images from said image intensifiers are passed through said other image guides and are directed in one united body to said image pickup means.

11. A radiation imaging apparatus according to claim 10, wherein a relay lens is provided between an output surface of said other image guides and said image pickup means.

12. A radiation imaging apparatus comprising:
a plurality of scintillators for converting radiation emitted from a sample into scintillation light;
a plurality of image intensifier means for amplifying said scintillation light and for forming an image of said radiation, said image intensifier means providing a plurality of two-dimensional sections from the image of the sample, and each of said image intensifier means being associated with a different one of said sections and receiving scintillation light corresponding to radiation emitted from said respective section of the sample, whereby a continuous image can be reintegrated from the outputs of said plurality of image intensifiers.

13. A radiation imaging apparatus according to claim 12, wherein said image intensifier means includes a plurality of image guides for directing scintillation light to said respective image intensifiers.

14. A radiation imaging apparatus according to claim 13, wherein said image guides have an output cross-sectional area smaller than an input cross-sectional area.

15. A radiation imaging apparatus according to claim 12, wherein said image intensifiers are fiber optic input image intensifiers.

* * * * *